US012712984B2

(12) United States Patent
Chan et al.

(10) Patent No.: US 12,712,984 B2
(45) Date of Patent: Aug. 18, 2026

(54) ACTIVE DIGITAL DELEGATE FOR MEETINGS AND CONFERENCES

(71) Applicant: International Business Machines Corporation, Armonk, NY (US)

(72) Inventors: Allen Vi Cuong Chan, Markham (CA); Yazan Obeidi, Markham (CA); Sebastian Carbajales, Mississauga (CA); Benjamin Luong, Toronto (CA); Will Wu, North York (CA); Paul Ferski, Markham (CA); Hua Huang, Markham (CA); Lionel Wu, Ontario (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 262 days.

(21) Appl. No.: 18/503,675

(22) Filed: Nov. 7, 2023

(65) Prior Publication Data

US 2025/0150554 A1 May 8, 2025

(51) Int. Cl.
*H04N 7/15* (2006.01)

(52) U.S. Cl.
CPC ............. *H04N 7/152* (2013.01); *H04N 7/155* (2013.01)

(58) Field of Classification Search
None
See application file for complete search history.

(56) References Cited

U.S. PATENT DOCUMENTS

2009/0181659 A1* 7/2009 Stalnacke ............. H04M 3/387 705/7.18
2011/0107236 A1 5/2011 Sambhar
(Continued)

FOREIGN PATENT DOCUMENTS

| | | | |
|---|---|---|---|
| CN | 110866110 | A | 3/2020 |
| CN | 112836476 | A | 2/2021 |
| WO | 2022069927 | A1 | 10/2020 |

OTHER PUBLICATIONS

Anonymous "Use agent to attend multiple conference call and take predefined action when certain topic is discussed" ip.com May 7, 2015.

(Continued)

*Primary Examiner* — Duc Nguyen
*Assistant Examiner* — Assad Mohammed
(74) *Attorney, Agent, or Firm* — Amin, Turocy & Watson, LLP

(57) ABSTRACT

One or more systems, devices, computer program products and/or computer-implemented methods of use provided herein relate to teleconferencing and, more specifically, to the gathering and conveying of information over a teleconference by a digital delegate. A computer-implemented system can comprise a memory that can store computer executable components. The computer-implemented system can further comprise a processor that can execute the computer executable components stored in the memory, wherein the computer executable components can comprise a digital delegate component that accesses a teleconference via a computer application as a teleconference participant and an analysis component that analyzes teleconference monitoring information of the teleconference to determine responses to one or more defined points of interest determined by a meeting invitee.

20 Claims, 8 Drawing Sheets

(56) References Cited

U.S. PATENT DOCUMENTS

| | | | | |
|---|---|---|---|---|
| 2017/0206797 | A1* | 7/2017 | Solomon | G06N 3/006 |
| 2017/0339199 | A1* | 11/2017 | Saez | H04M 1/03 |
| 2020/0092519 | A1 | 3/2020 | Shin et al. | |
| 2020/0334419 | A1 | 10/2020 | Raanani et al. | |
| 2023/0262102 | A1* | 8/2023 | Das | H04N 7/147<br>715/753 |
| 2024/0005085 | A1* | 1/2024 | Kukde | G10L 25/78 |
| 2024/0235869 | A1* | 7/2024 | Ellis | H04L 12/1822 |
| 2024/0281677 | A1* | 8/2024 | Mifflin | G06N 5/04 |
| 2025/0103625 | A1* | 3/2025 | Addanki | G06F 16/3326 |
| 2025/0139057 | A1* | 5/2025 | Deutsch | G06F 3/0482 |

OTHER PUBLICATIONS

Thompson et al., “Agent Based Ontology Driven Virtual Meeting Assistant” ResearchGate Dec. 13, 2010.

Anonymous “A Method to Automatically Extract Key Information Elements During an Online Meeting” ip.com Jul. 12, 2022.

* cited by examiner

108

PROCESSOR
106

DIGITAL DELEGATE COMPONENT
110

ANALYSIS COMPONENT
112

QUESTION COMPONENT
114

ISSUE COMPONENT
116

NOTIFICATION COMPONENT
118

PREDICTION COMPONENT
220

SUMMARY COMPONENT
322

MEMORY 104

DIGITAL DELEGATE SYSTEM

ACTIVE DIGITAL DELEGATE FOR MEETINGS AND CONFERENCES

BACKGROUND

The subject disclosure relates to teleconferencing and, more specifically, to the gathering and conveying of information over a teleconference.

SUMMARY

The following presents a summary to provide a basic understanding of one or more embodiments described herein. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products that can facilitate attendance at a teleconference meeting by a digital delegate are discussed.

According to an embodiment, a computer-implemented system can comprise a memory that can store computer executable components. The computer-implemented system can further comprise a processor that can execute the computer executable components stored in the memory, where the computer executable components can comprise a digital delegate component that can access a teleconference via a computer application as a teleconference participant and an analysis component that can analyze teleconference monitoring information of the teleconference to determine responses to one or more defined points of interest determined by a meeting invitee.

According to another embodiment, a computer-implemented method can comprise accessing, by a system operatively coupled to processor, a teleconference via a computer application as a teleconference participant and analyzing, by the system, teleconference monitoring information of the teleconference to determine responses to one or more defined points of interest determined by a meeting invitee.

According to yet another embodiment, a computer program product for facilitating attendance at a teleconference meeting by a digital delegate, is provided. The computer program product can comprise a computer readable storage medium having program instructions embodied therewith, the program instructions executable by a processor to cause the processor to access, by the processor, a teleconference via a computer application as a teleconference participant and further cause the processor to analyze, by the processor, teleconference monitoring information of the teleconference to determine responses to one or more defined points of interest determined by a meeting invitee.

DETAILED DESCRIPTION

Figure 1:
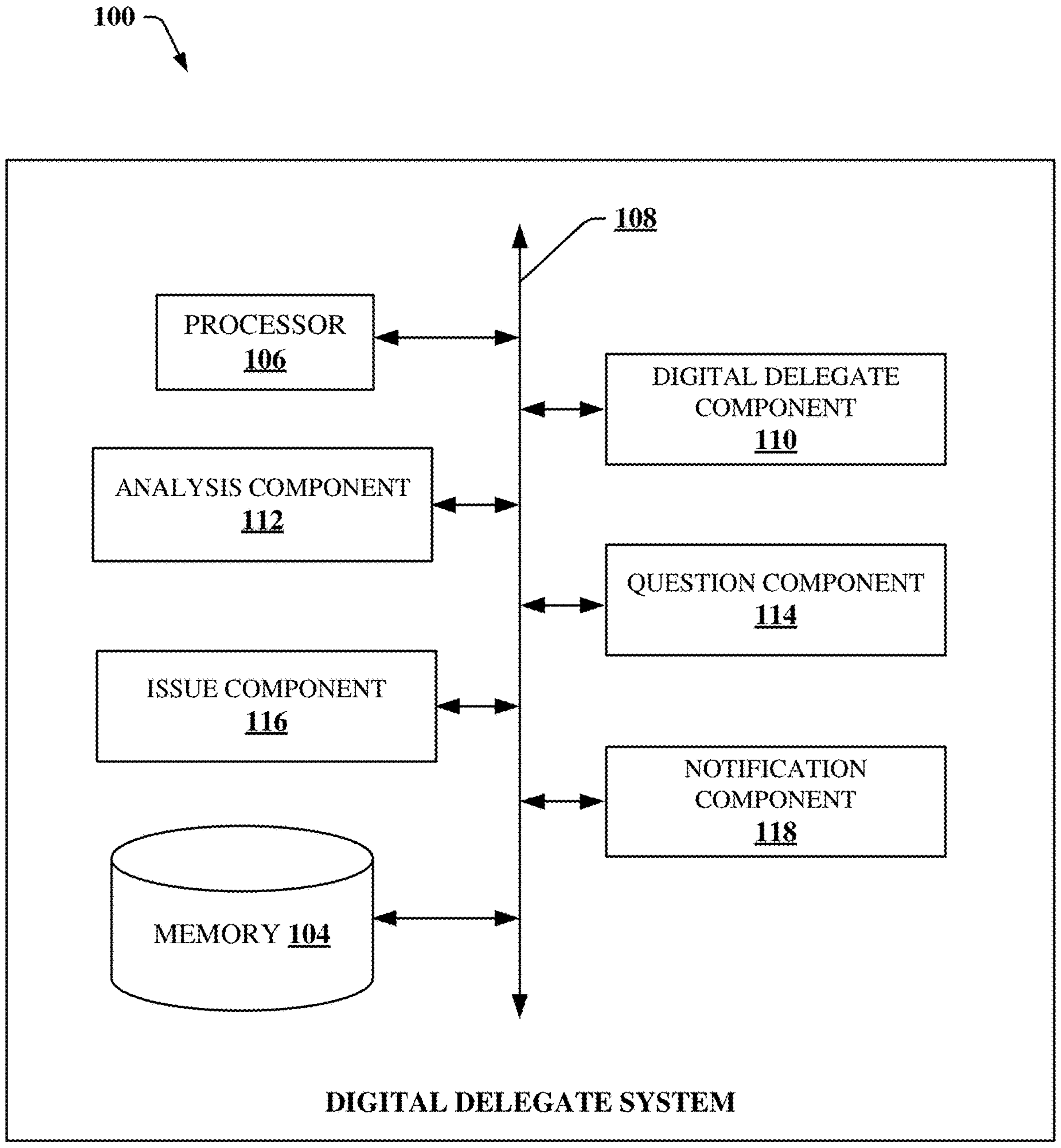
FIG. 1 illustrates a block diagram of an example, non-limiting system that can facilitate attendance at a teleconference meeting by a digital delegate in the place of a meeting invitee in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Teleconferencing allows meeting participants in various locations to interact and collaborate in real time. The term "teleconference" as used herein can be or include, but is not limited to, meetings such as audio conferences, video conferences, web conferences, and other forms of virtual meetings. In some embodiments, for example, with regard to video implementations, one or more embodiments of teleconferences described herein can include, but are not limited to, video conferences such as those provided via WebEx or Zoom.

Teleconferences are conducted in real time via a distributed network, such as the internet. Teleconferencing computer applications facilitate communication between meeting participants. Different teleconferencing computer applications offer various features and capabilities such as audio conferencing, video conferencing, screen sharing, document sharing, multimedia sharing, file sharing, chat functions, white boarding, and the ability to host and schedule meetings. For example, in audio conferencing, participants can join a virtual conference room via a teleconferencing application installed on a device. The application can establish a shared audio channel allowing for real time communication between participants. Video conferencing features of a teleconferencing application can add video streaming capabilities to a shared virtual space. Various teleconferencing applications allow for a sharing of presentation materials with all or some meeting participants.

To access a virtual conference room, participants may receive an invitation from a meeting host. The invitation can comprise a universal resource link that links participants directly to the virtual meeting room. Alternatively, the universal resource link can link participants to a virtual waiting room where participants are authenticated, such as by a passcode or a two-step verification process. The meeting invitation may comprise a meeting passcode or other security information.

An advantage of teleconference meetings over traditional in-person meetings is that meeting participants may be at remote locations from one another and still be able to collaborate in real time. Teleconferencing alone does not address that a meeting invitee may be invited to multiple meetings (teleconference or otherwise) at the same time. For example, the meeting invitee may be invited to take part in two teleconference meetings scheduled for the same time. Although the meeting invitee would not need to physically be at two different locations at one time to attend both meetings, the meeting invitee still may be unable to devote adequate attention to both meetings at one time. The meeting invitee would likely need to choose one teleconference meeting to attend and would need to gather information from the missed teleconference meeting from other meeting participants of the missed meeting or from a meeting recording or transcript. The post meeting gathering of information by the meeting invitee can be inefficient. Further, the meeting invitee would not be able to contribute information or perspectives to participants attending the missed meeting.

Various embodiments of the present disclosure can be implemented to allow a meeting participant to effectively participate in multiple meetings occurring at the same time through use of a digital delegate. The digital delegate can be a digital representation of a meeting invitee that can perform tasks in a teleconference meeting on behalf of the meeting invitee. The digital delegate can appear in a teleconference window as a meeting participant. The digital delegate can appear as a virtual avatar. The digital delegate can indicate the identity of the meeting invitee for which the digital delegate is attending the teleconference on behalf of. A meeting host can send a meeting invite directly to a digital delegate. For example, a digital delegate can be associated with an email address. Alternatively, a meeting invitee can edit participants of a meeting to include the digital delegate identity when the meeting invitee decides to send the digital delegate to the teleconference in the meeting invitee's place. In an embodiment, the digital delegate can be associated with a calendar or other scheduler. The digital delegate can, in response to receiving a meeting invitation either directly from the original meeting invitee or from the teleconference host, schedule the meeting that the digital delegate is assigned to. The digital delegate can automatically join a teleconference at a scheduled time. The digital delegate can automatically join a teleconference using a universal resource link included in the teleconference invitation and any relevant security information included in the invitation.

The digital delegate can perform various tasks within a teleconference meeting such as generating and sending messages in a teleconference chat, generating and conveying audio messages to teleconference participants, and sharing presentations or other files with other teleconference participants. The digital delegate can also monitor and analyze meeting content and generate key points and a summary for review. In an embodiment, the digital delegate can utilize artificial intelligence (AI) techniques to dynamically interact with meeting participants. In an embodiment, the digital delegate can have access to a personalized knowledge base associated with the meeting invitee for which the digital delegate is acting on behalf of.

Existing technology is available that monitors meetings through recording or other mechanisms. Such technologies may assist a meeting invitee who was unable to attend a teleconference to gather information discussed in the meeting. Such technologies, however, do not assist meeting participants who are present for the meeting. For example, monitoring technologies do not interact with meeting participants or contribute to meeting discussion topics. Further, the meeting invitee who was not able to attend the meeting was not able to contribute to discussions in the meeting or raise questions or concerns during the meeting. It is desirable that if a meeting invitee is not able to join a teleconference that the meeting invitee could send a digital delegate that is able to participate in the teleconference in the meeting invitee's place. It is highly desirable that the digital delegate closely represent the meeting invitee's knowledge, concerns, and interests. This minimizes the negative effect on meeting productivity by having a meeting invitee who is unable to attend.

Although various technologies utilizing artificial intelligence are able to interact with other entities via messages or dialogue, invitees of a meeting often each have particular domains of knowledge and areas of expertise and standard robots cannot accurately represent a meeting invitee who is unable to attend a meeting. In an embodiment, a digital delegate component can accurately represent the knowledge, concerns, and interests of a meeting invitee who is unable to attend a teleconference.

In an example, a meeting invitee can receive meeting invitations to two teleconferences scheduled for overlapping times. The meeting invitee is unable to join and devote adequate attention to both meetings. Prior to the meeting time, the meeting invitee can launch the digital delegate and prepare the digital delegate for a teleconference that the meeting invitee will not attend. For example, the digital delegate can be launched on a cell phone, tablet, or other computer with internet connection. The digital delegate can be associated with its own virtual identity can receive an invitation to a teleconference meeting directly. Alternatively, the digital delegate can be forwarded an invitation or invited separately to the teleconference meeting by the meeting invitee. The digital delegate can be associated with a scheduler that schedules the digital delegate to join a teleconference at a time indicated by the meeting invitation. The meeting invitee that has received multiple meeting invitations to multiple meetings can pass on a meeting invitation comprising a universal resource link to a digital delegate for meetings that the meeting invitee intends the digital delegate to attend and can refrain from passing on invitations to meetings in which the meeting invitee intends to attend personally.

For example, the meeting invitee can prepare the digital delegate for the teleconference that the meeting invitee will not attend by providing information related to relevant meeting topics to a personalized knowledge base. The digital delegate can access the personalized knowledge base during the meeting. The personalized knowledge base can comprise data associated with a meeting invitee's area of expertise. For example, the knowledge base can comprise information relating to the meeting invitee's occupation. The knowledge base can also comprise information related to particular projects associated with the meeting invitee. In an embodiment, the knowledge base can be connected to a network, such as the internet. In an embodiment, the digital delegate can update the knowledge base with information acquired during teleconferences and other meetings. In an embodiment, the meeting invitee can further prepare the digital delegate to replace the meeting invitee in a teleconference by indicating specific questions, concerns, and interests that the meeting invitee would like to have resolved through the teleconference.

By providing general information relating to the meeting invitee's occupation and the specific projects that the meeting invitee is working on that are relevant to the meeting, the digital delegate can be prepared to answer some questions that may arise in the teleconference meeting. For example, a teleconference is conducted to discuss progress on a particular project. A meeting invitee is unable to attend the teleconference due to a conflict. The meeting invitee can input relevant information pertaining to the meeting invitee's role in the project. In an embodiment, the meeting invitee can directly input the information into software associated with the digital delegate. Alternatively, the digital delegate can access various documents associated with the project in the meeting invitee's drive. For example, the meeting invitee may grant the digital delegate access to a particular folder or to particular messages. The knowledge base can also comprise more general information relating to what the meeting invitee's role in the project is. The digital delegate component can continually update the knowledge base with more relevant information as information is collected from one or more teleconferences or other meetings.

The digital delegate component can comprise an artificial intelligence component that utilizes various artificial intelligence techniques to answer questions that arise over the course of a teleconference based on the information in the knowledge base. For example, a digital delegate component can use a combination of a knowledge graph and a large language model to recognize and answer questions from other meeting participants.

Further, the meeting invitee can input specific points of interest such as instructions, questions, concerns, or issues that the meeting invitee would like to be discussed during the meeting. This information can further be stored in the knowledge base. For example, the meeting invitee can direct the digital delegate to remind a particular meeting participant that a specific topic should be brought up. For another example, the meeting invitee may have three questions to ask various other meeting participants of the missed teleconference. The digital delegate component can analyze live audio, video, and chat of the meeting to determine whether the teleconference monitoring information addresses the questions, concerns, or issues raised by the meeting invitee. For example, the digital delegate component can analyze the teleconference monitoring information using various natural language processing techniques. The digital delegate can utilize various artificial intelligence techniques to determine whether the monitoring information is sufficient to support an answer or resolution to the points of interest raised by the meeting invitee. In response to a determination that a point of interest has not been addressed, the digital delegate component can raise the point of interest in the teleconference. In an embodiment, the meeting invitee can provide the point of interest exactly how the meeting invitee would like the digital delegate to raise the point of interest. For example, the digital delegate can determine that the teleconference monitoring information does not answer one of the meeting invitee's questions. The digital delegate can communicate the question to the rest of the meeting participants over a chat or through audio communication.

In an embodiment, the digital delegate can raise points of interest at a defined point in the meeting. For example, the digital delegate may raise the point of interest after another meeting participant asks if there are any questions. The digital delegate may raise the point of interest at the end of the meeting or at the end of a presentation by another meeting participant. The digital delegate can raise the point of interest at an appropriate time based on an analysis of the teleconference monitoring information. The digital delegate can utilize AI techniques to recognize various topics being discussed in a meeting. In an embodiment, the digital delegate can associate a point of interest with a topic or domain to be discussed in the meeting.

Prior to the meeting, the digital delegate can utilize meeting context such as a meeting agenda and information associated with related meetings to generate a template of predicted questions or concerns that may arise in the meeting. The digital delegate can prompt the meeting invitee to enter any answers or resolutions that the meeting invitee is aware of in response to the predicted questions or concerns so that should those questions or concerns arise in the meeting, the digital delegate can be prepared with a response without the need to alert the meeting invitee.

In an embodiment, the digital delegate can alert the meeting invitee that the meeting invitee's presence is requested in the meeting. For example, a meeting participant may have a question for the meeting invitee. The meeting participant can direct the question to the digital delegate. The digital delegate may or may not be able to answer the question based on the information in the knowledge base. If the knowledge base does not support an answer to the question, the digital delegate can request the presence of the meeting invitee in the teleconference for a brief time. Alternatively, the digital delegate can communicate the question to the meeting invitee and prompt the meeting invitee to enter a response to the question. The digital delegate can then relay the answer to the question to the meeting participant in the teleconference.

After the teleconference has ended the digital delegate can generate a summary of the teleconference based on the teleconference monitoring information. The digital delegate can utilize contextual learning to generate and highlight key points of the meeting. The digital delegate can assemble the summary and key points for the meeting invitee to efficiently review following the teleconference.

The embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting system 100 as illustrated at FIG. 1, and/or systems thereof, can further comprise, be associated with and/or be coupled to one or more computer and/or computing-based elements described herein with reference to an operating environment, such as the operating environment 800 illustrated at FIG. 8. For example, system 100 can be associated with, such as accessible via, a computing environment 800 described below with reference to FIG. 8, such that aspects of processing can be distributed between system 100 and the computing environment 800. In one or more described embodiments, computer and/or computing-based elements can be used in connection with implementing one or more of the systems, devices, components and/or computer-implemented operations shown and/or described in connection with FIG. 1 and/or with other figures described herein.

FIG. 1 illustrates a block diagram of an example, non-limiting system 100 that can facilitate attendance at a teleconference meeting by a digital delegate in the place of a meeting invitee in accordance with one or more embodiments described herein. System 100 can comprise memory 104, processor 106, system bus 108, digital delegate component 110, analysis component 112, question component 114, issue component 116, and notification component 118.

System 100 and/or the components of the system 100 can be employed to use hardware and/or software to solve problems that are highly technical in nature that are not abstract and that cannot be performed as a set of mental acts by a human.

Discussion turns briefly to processor 102, memory 104 and bus 106 of system 100. For example, in one or more embodiments, system 100 can comprise processor 102 (e.g., computer processing unit, microprocessor, classical processor, and/or like processor). In one or more embodiments, a component associated with system 100, as described herein with or without reference to the one or more figures of the one or more embodiments, can comprise one or more computer and/or machine readable, writable and/or executable components and/or instructions that can be executed by processor 102 to enable performance of one or more processes defined by such component(s) and/or instruction(s).

In one or more embodiments, system 100 can comprise a computer-readable memory (e.g., memory 104) that can be operably connected to the processor 102. Memory 104 can store computer-executable instructions that, upon execution by processor 102, can cause processor 102 and/or one or more other components of system 100 (e.g., digital delegate component 110, analysis component 112, question component 114, issue component 116, and/or notification component 118) to perform one or more actions. In one or more embodiments, memory 104 can store computer-executable components ((e.g., digital delegate component 110, analysis component 112, question component 114, issue component 116, and/or notification component 118).

System 100 and/or a component thereof as described herein, can be communicatively, electrically, operatively, optically and/or otherwise coupled to one another via bus 106. Bus 106 can comprise one or more of a memory bus, memory controller, peripheral bus, external bus, local bus, and/or another type of bus that can employ one or more bus architectures. One or more of these examples of bus 106 can be employed. In one or more embodiments, system 100 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical computing devices, communication devices and/or like devices), such as via a network. In one or more embodiments, one or more of the components of system 100 can reside in the cloud, and/or can reside locally in a local computing environment (e.g., at a specified location(s)).

In addition to the processor 102 and/or memory 104 described above, system 100 can comprise one or more computer and/or machine readable, writable and/or executable components and/or instructions that, when executed by processor 102, can enable performance of one or more operations defined by such component(s) and/or instruction(s). For example, in an embodiment, a digital delegate component can access a teleconference via a computer application as a teleconference participant.

In an embodiment, a digital delegate component 110 can comprise an artificial Intelligence_component that utilizes various artificial intelligence techniques to answer questions that arise over the course of a teleconference based on the information in the knowledge base. The digital delegate component can access a teleconference via a computer application as a teleconference participant using information in a teleconference invitation, such as a universal resource link or various security measures. The digital delegate component manifests a digital delegate that represents the knowledge, concerns, and interests of a meeting invitee who is not able to attend the teleconference. The digital delegate can allow multiple meetings occurring at the same time to benefit from the knowledge and perspectives of a single meeting invitee that is unable to attend more than one meeting.

In an embodiment, an analysis component 112 can analyze teleconference monitoring information of the teleconference to determine responses to one or more defined points of interest determined by a meeting invitee. For example, teleconference monitoring information can be obtained through recording of the teleconference meeting. Teleconference monitoring information can comprise chat data, audio data, and visual data including live video of meeting participants as well as shared files and presentations. Analysis component 112 can analyze teleconference monitoring information using one or more artificial intelligence techniques. The one or more defined points of interest can be instructions, questions, concerns, or issues that the meeting invitee would like to be discussed during the meeting. For example, if a point of interest is a question, the analysis component 112 can analyze teleconference audio and shared files to determine if the teleconference monitoring information supports an answer to the question. For another example, if a point of interest is a reminder to meeting participant X to discuss a topic Y, analysis component 112 can analyze teleconference monitoring information to determine whether meeting participant X discussed topic Y. Analysis component 112 can determine whether the teleconference monitoring information fails to support a response to at least one of the one or more defined points of interest.

In an embodiment, the question component 114 can, in response to a determination by analysis component 112 that the teleconference monitoring information fails to support a response to at least one of the one or more defined points of interest, generate and communicate to participants of the teleconference one or more questions to elicit information related to the at least one of the one or more defined points of interest. In an embodiment, the generated one or more questions can be the same as questions inputted by the meeting invitee. In an embodiment, the question can prompt a discussion that generates teleconference monitoring information that will support one or more unresolved points of interest. The question component 114 can continue to generate and communicate questions to prompt discussion until the analysis component determines that all points of interest have been answered or resolved.

In an embodiment, issue component 116 can determine whether an issue that arises during the teleconference can be addressed with information present in the knowledge base. The digital delegate component 110 can access the knowledge base comprising information associated with the meeting invitee. A question or issue may come up in a meeting that would normally be addressed or resolved by the meeting invitee. Often, the digital delegate can analyze the question or issue using contextual learning and can locate an answer to the question in the knowledge base. The digital delegate component 110 can then communicate the answer or resolution to the other meeting participants through chat, audio, or other means. The issue component 116 can further determine that a response to an issue or question that arises in the teleconference that would normally be directed to the meeting invitee is not present in the knowledge base, and so the digital delegate component 110 cannot provide an answer. The issue component 116 can further, in response to a determination that the issue can be addressed with the information present in the knowledge repository, the issue component generates a response to the issue that comprises the information present in the knowledge repository.

In an embodiment, the notification component 118 can, in response to a determination that the issue cannot be addressed with information present in the knowledge repository, communicate a message to the meeting invitee prompting the meeting invitee to join the teleconference. Notification component 118 can alert the meeting invitee that the meeting invitee's presence is requested in the meeting. For example, a meeting participant may have a question for the meeting invitee. The meeting participant can direct the question to the digital delegate. The digital delegate may or may not be able to answer the question based on the information in the knowledge base. If the knowledge base does not support an answer to the question, the digital delegate can request the presence of the meeting invitee in the teleconference for a brief time. Alternatively, the digital delegate can communicate the question to the meeting invitee and prompt the meeting invitee to enter a response to the question. The digital delegate can then relay the answer to the question to the meeting participant in the teleconference.

Figure 2:
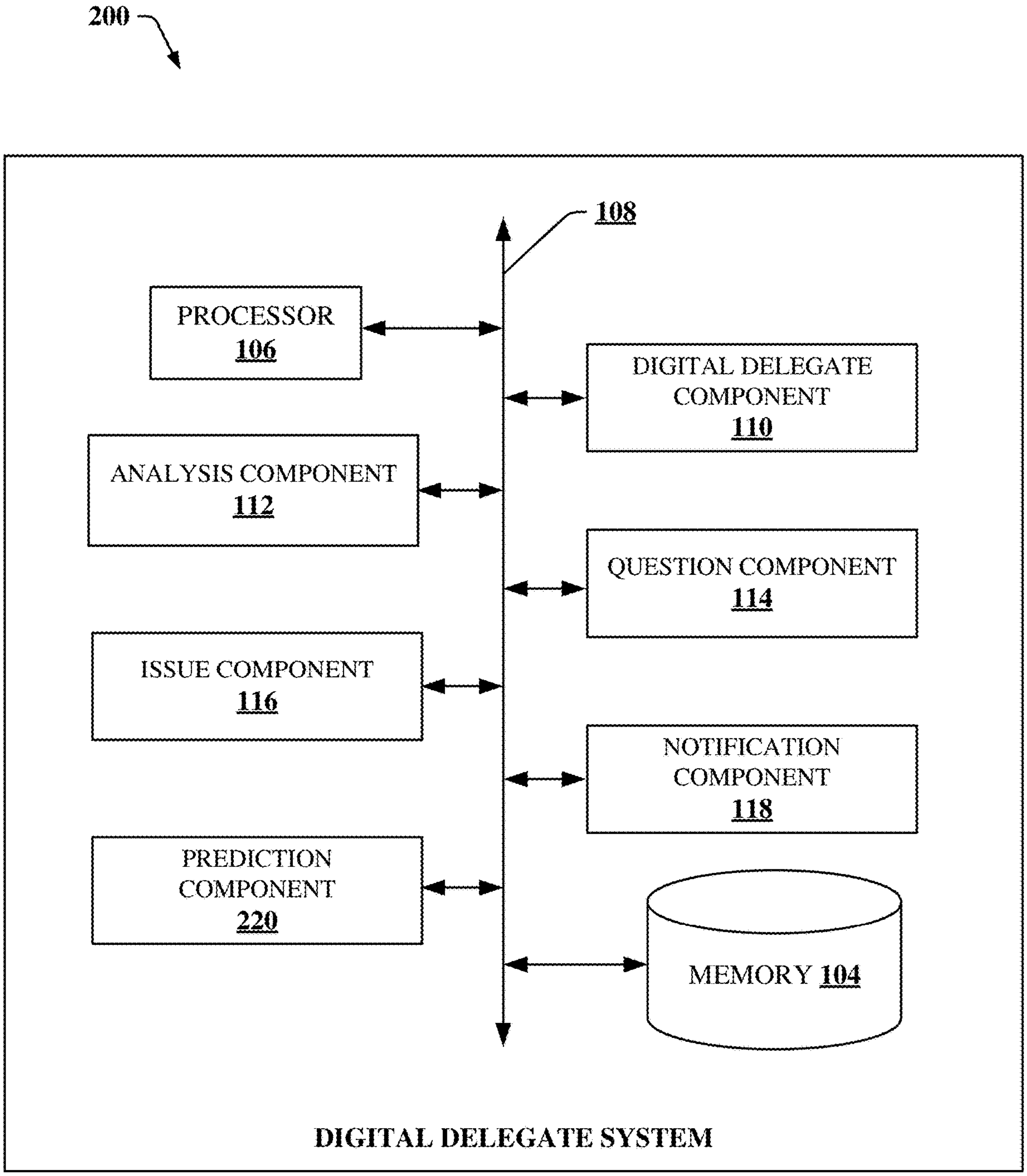
FIG. 2 illustrates a block diagram of an example, non-limiting system that can facilitate attendance at a teleconference meeting by a digital delegate in the place of a meeting invitee in accordance with one or more embodiments described herein.

FIG. 2 illustrates a block diagram of an example, non-limiting system 200 that can facilitate attendance at a teleconference meeting by a digital delegate in the place of a meeting invitee in accordance with one or more embodiments described herein. System 200 can comprise memory 104, processor 106, system bus 108, digital delegate component 110, analysis component 112, question component 114, issue component 116, notification component 118, and prediction component 220. Repetitive description of like elements and/or processes employed in respective embodiments is omitted for sake of brevity.

In an embodiment, prediction component 220 can, prior to the teleconference, generate one or more predicted points of interest that will arise in the teleconference based on context of the teleconference. The context of the teleconference can be, for example, an agenda of the teleconference or monitoring information from related teleconferences. The prediction component 220 can generate a template of predicted questions or concerns that may arise in the meeting. The prediction component 220 can further prompt the meeting invitee to input additional information relating to one or more predicted points of interest. The prediction component 220 can prompt the meeting invitee to enter any answers or resolutions that the meeting invitee is aware of in response to the predicted questions or concerns so that should those questions or concerns arise in the meeting, the digital delegate can be prepared with a response without the need to alert the meeting invitee.

Figure 3:
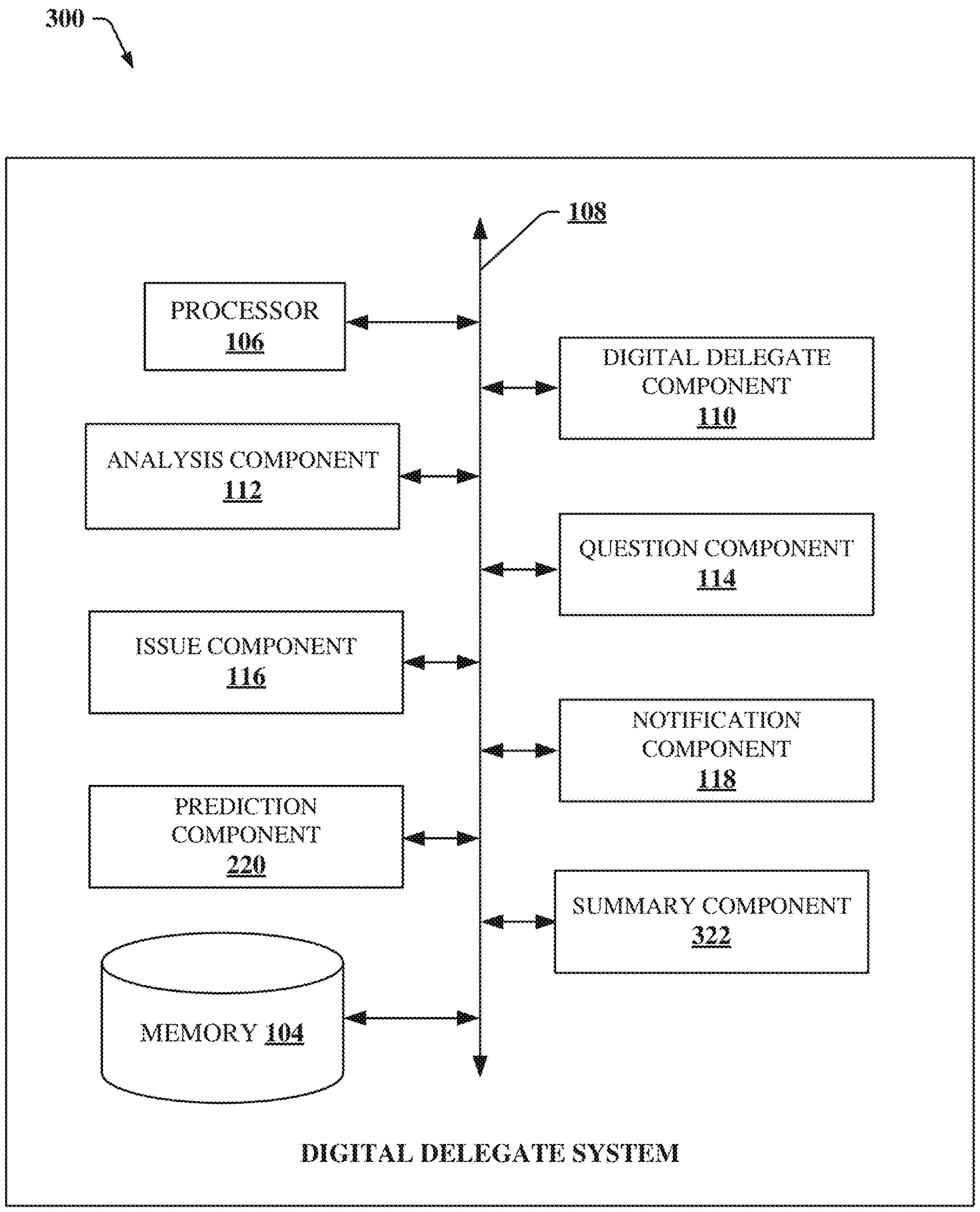
FIG. 3 illustrates a block diagram of an example, non-limiting system that can facilitate attendance at a teleconference meeting by a digital delegate in the place of a meeting invitee in accordance with one or more embodiments described herein.

FIG. 3 illustrates a block diagram of an example, non-limiting system 300 that can facilitate attendance at a teleconference meeting by a digital delegate in the place of a meeting invitee in accordance with one or more embodiments described herein. System 300 can comprise memory 104, processor 106, system bus 108, digital delegate component 110, analysis component 112, question component 114, issue component 116, notification component 118, prediction component 220, and summary component 322. Repetitive description of like elements and/or processes employed in respective embodiments is omitted for sake of brevity.

In an embodiment, summary component 322 can generate a summary of the teleconference based on at least one of teleconference audio, teleconference video, or teleconference chat. In another embodiment, summary component 322 can further generate key points of the teleconference based on at least one of teleconference audio, teleconference video, or teleconference chat.

Figure 4:
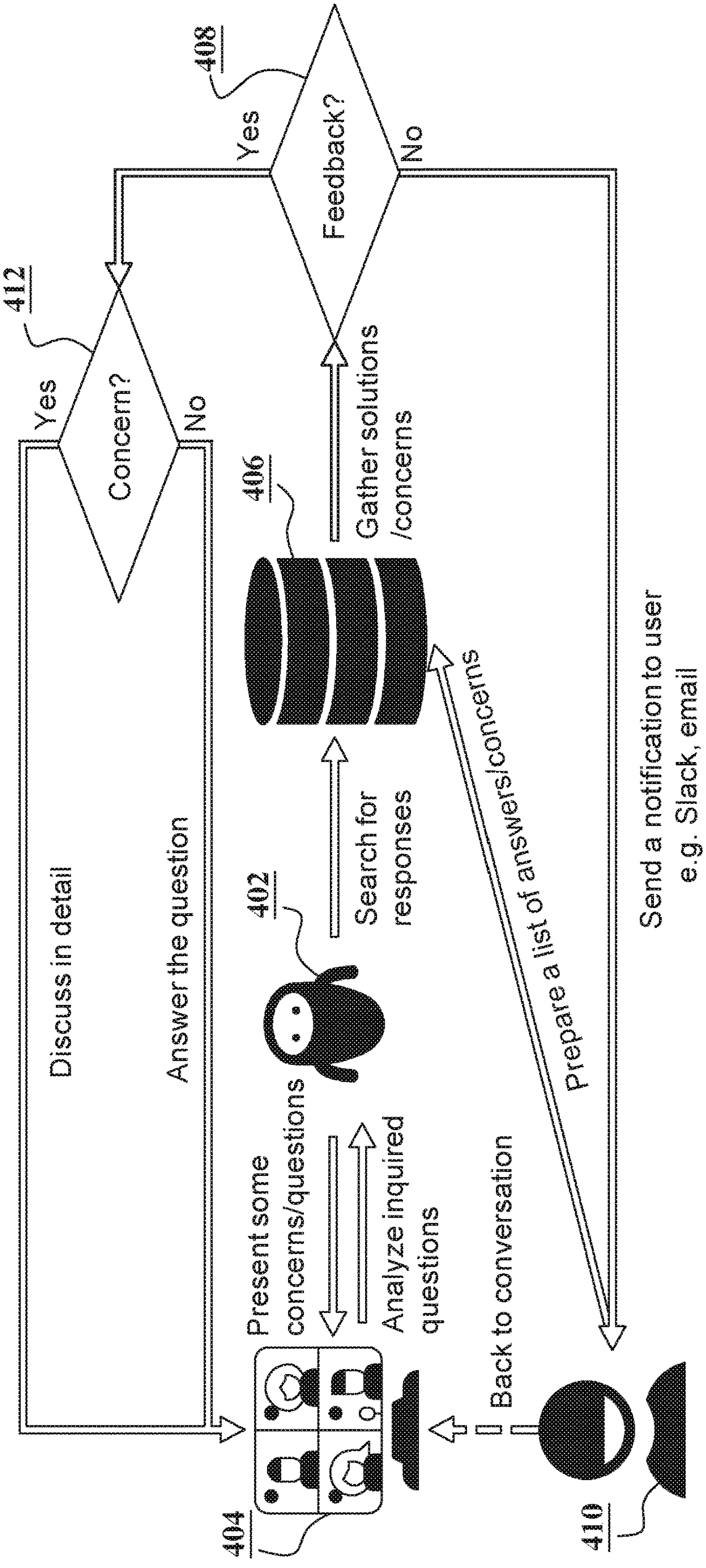
FIG. 4 illustrates a flow diagram of an example, non-limiting method that can facilitate attendance at a teleconference meeting by a digital delegate in the place of a meeting invitee in accordance with one or more embodiments described herein.

FIG. 4 illustrates a flow diagram of an example, non-limiting method 400 that can facilitate attendance at a teleconference meeting by a digital delegate in the place of a meeting invitee in accordance with one or more embodiments described herein. Repetitive description of like elements and/or processes employed in respective embodiments is omitted for sake of brevity.

Digital delegate (e.g., digital delegate component 402) can participate in a teleconference 404 on behalf of meeting invitee 410. Other participants of teleconference 404 can present questions to digital delegate 402. Digital delegate 402 search for responses to the questions in knowledge base 406. If an answer to a question is present in the knowledge base, the digital delegate 402 can gather solutions and concerns related to the question. If the knowledge base 406 does not comprise information supporting a solution or concern to the question, the system (e.g., notification component 118) will notify the meeting invitee 410 that a question arose during the teleconference meeting in the meeting invitee's domain of expertise that the digital delegate cannot answer. The meeting invitee 410 can prepare a response to the questions or concerns of the other participants in the teleconference. The response can be provided to knowledge base 406 so that the digital delegate may prepare a response based on the response of the meeting invitee 410.

If the knowledge base comprises an answer or solution to the question and the digital delegate 402 does not identify a concern associated with the question, the digital delegate will prepare a response and answer the question in the teleconference. If the knowledge base comprises an answer or solution to the question and the digital delegate 402 does identify a concern associated with the question, the digital delegate can generate prompts intended to elicit further discussion on the topic as well as provide an answer or solution.

Additionally, the digital delegate 402 can present questions and concerns to the other participants in the teleconference. For example, the questions and concerns can be points of interest input by the meeting invitee 410.

Figure 5:
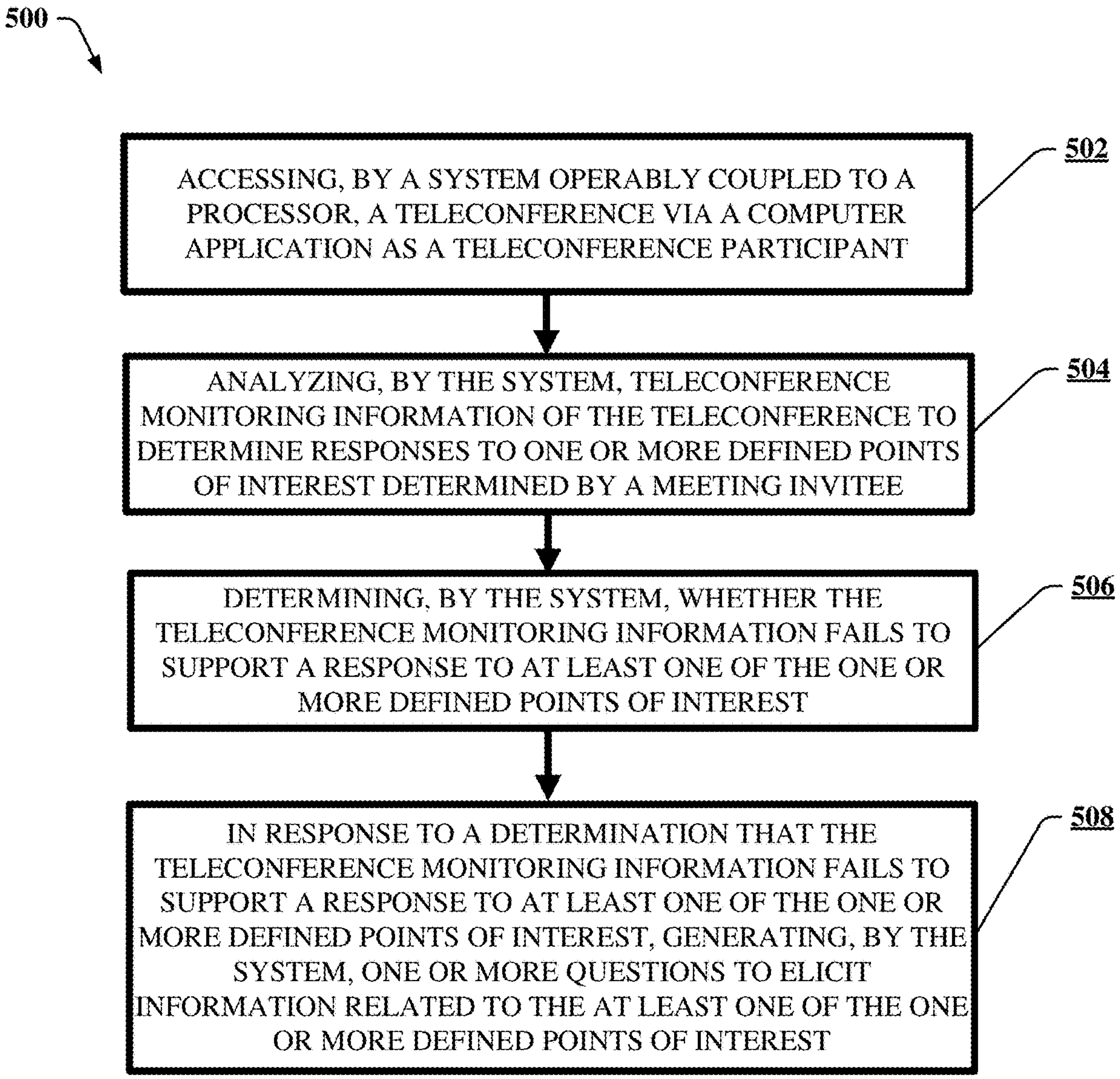
FIG. 5 illustrates a flow diagram of an example, non-limiting method that can facilitate attendance at a teleconference meeting by a digital delegate in the place of a meeting invitee in accordance with one or more embodiments described herein.

FIG. 5 illustrates a flow diagram of an example, non-limiting method 500 that can facilitate attendance at a teleconference meeting by a digital delegate in the place of a meeting invitee in accordance with one or more embodiments described herein. Repetitive description of like elements and/or processes employed in respective embodiments is omitted for sake of brevity.

Step 502 of the method 500 comprises accessing, by a system operably coupled to a processor (e.g., digital delegate component 110), a teleconference via a computer application as a teleconference participant. Step 504 of the method 500 comprises analyzing, by the system (e.g., analysis component 112), teleconference monitoring information of the teleconference to determine responses to one or more defined points of interest determined by a meeting invitee. Step 506 of the method 500 comprises determining, by the system (e.g., analysis component 112), whether the teleconference monitoring information fails to support a response to at least one of the one or more defined points of interest. Step 508 of the method 500 comprises in response to a determination that the teleconference monitoring information fails to support a response to at least one of the one or more defined points of interest, generating, by the system (e.g., question component 114), one or more questions to elicit information related to the at least one of the one or more defined points of interest.

Figure 6:
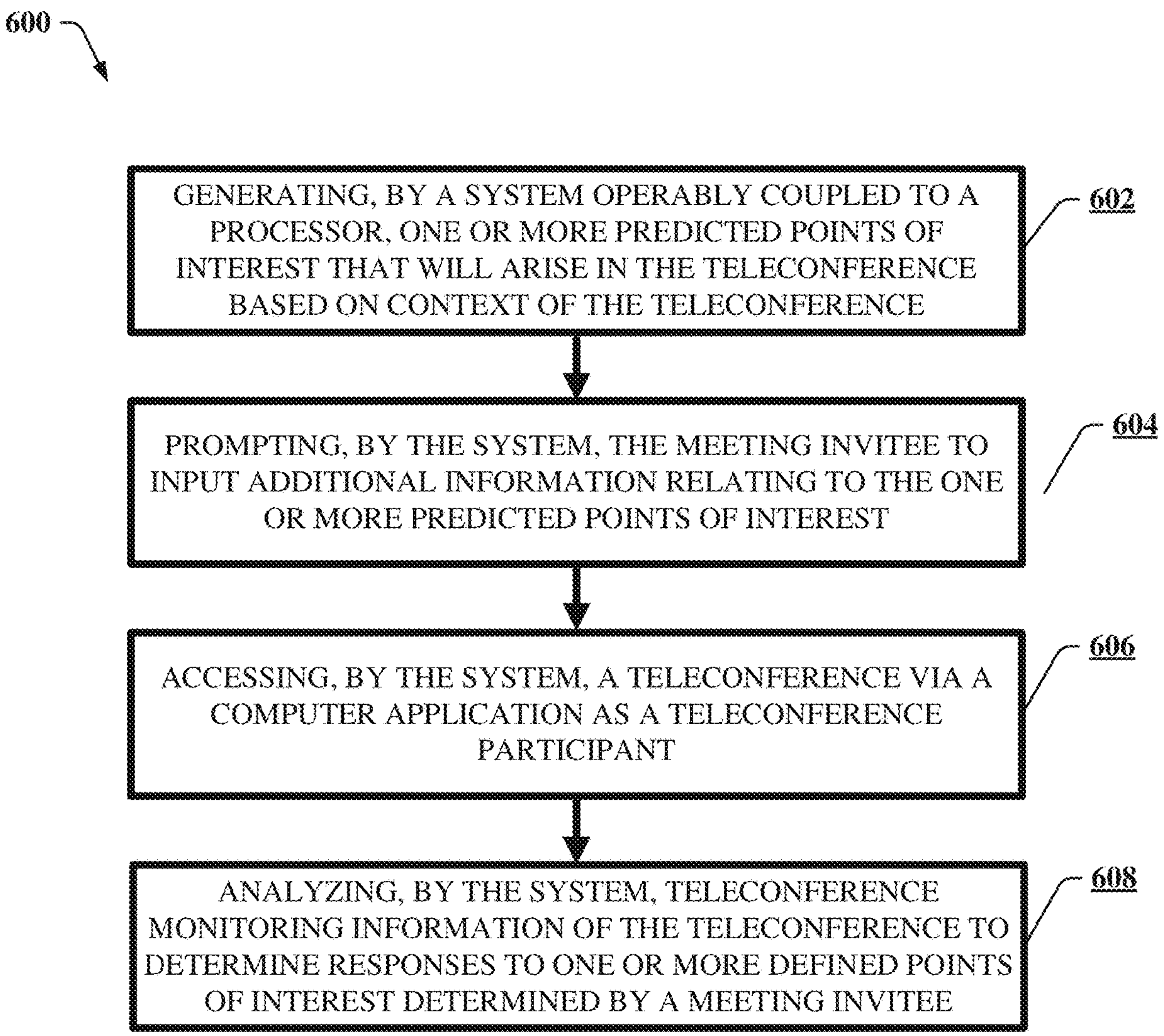
FIG. 6 illustrates a flow diagram of an example, non-limiting method that can facilitate attendance at a teleconference meeting by a digital delegate in the place of a meeting invitee in accordance with one or more embodiments described herein.

FIG. 6 illustrates a flow diagram of an example, non-limiting method 600 that can facilitate attendance at a teleconference meeting by a digital delegate in the place of a meeting invitee in accordance with one or more embodiments described herein. Repetitive description of like elements and/or processes employed in respective embodiments is omitted for sake of brevity.

Step 602 of the method 600 comprises generating, by a system operably coupled to a processor (e.g., prediction component 220), one or more predicted points of interest that will arise in the teleconference based on context of the teleconference. Step 604 of the method 600 comprises prompting, by the system (e.g., prediction component 220), the meeting invitee to input additional information relating to the one or more predicted points of interest. Step 606 of the method 600 comprises accessing, by the system (e.g., digital delegate component 110), a teleconference via a computer application as a teleconference participant. Step 608 of the method 600 comprises analyzing, by the system (e.g., analysis component 112), teleconference monitoring information of the teleconference to determine responses to one or more defined points of interest determined by a meeting invitee.

Figure 7:
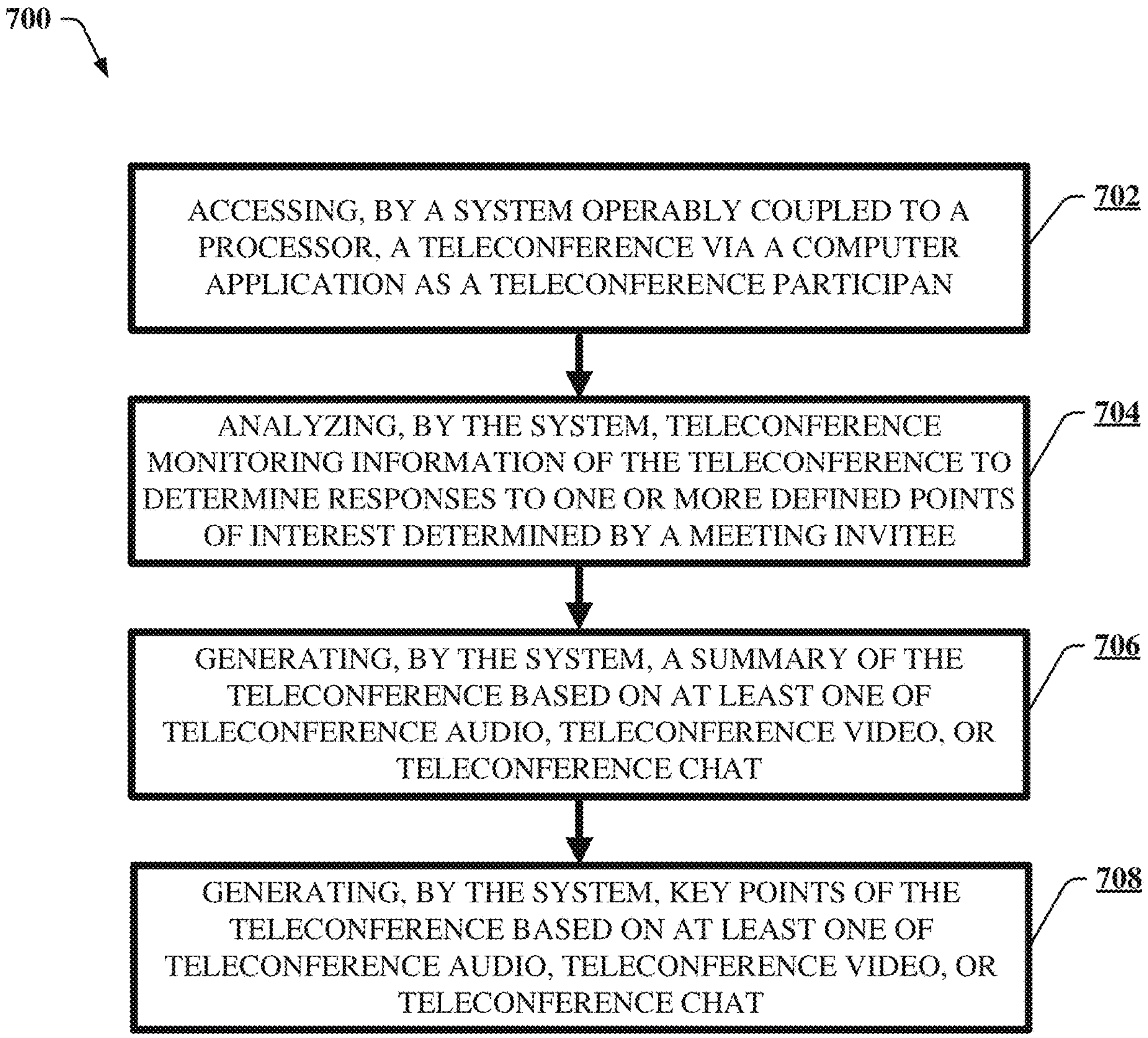
FIG. 7 illustrates an example, non-limiting method that can facilitate attendance at a teleconference meeting by a digital delegate in the place of a meeting invitee in accordance with one or more embodiments described herein.

FIG. 7 illustrates a flow diagram of an example, non-limiting method 700 that can facilitate attendance at a teleconference meeting by a digital delegate in the place of a meeting invitee in accordance with one or more embodiments described herein. Repetitive description of like elements and/or processes employed in respective embodiments is omitted for sake of brevity.

Step 702 of the method 700 comprises accessing, by a system operably coupled to a processor (e.g., digital delegate component 110), a teleconference via a computer application as a teleconference participant. Step 704 of the method 700 comprises analyzing, by the system (e.g., analysis component 112), teleconference monitoring information of the teleconference to determine responses to one or more defined points of interest determined by a meeting invitee. Step 706 of the method 700 comprises generating, by the system (e.g., summary component 322), a summary of the teleconference based on at least one of teleconference audio, teleconference video, or teleconference chat. Step 708 of the method 700 comprises generating, by the system (e.g., summary component 322), key points of the teleconference based on at least one of teleconference audio, teleconference video, or teleconference chat.

Figure 8:
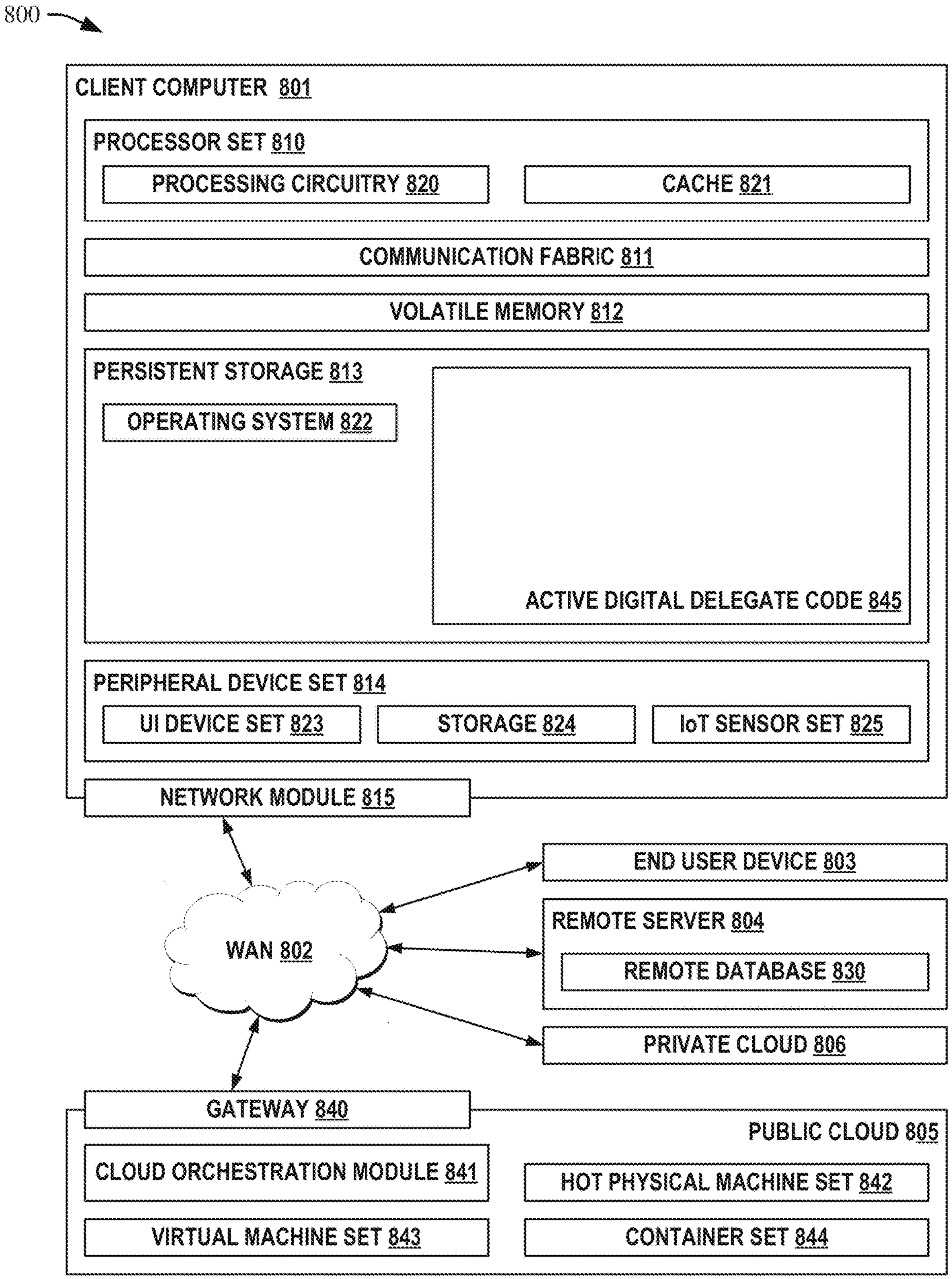
FIG. 8 illustrates a block diagram of an example, non-limiting operating environment in which one or more embodiments described herein can be facilitated.

FIG. 8 illustrates a block diagram of an example, non-limiting, operating environment in which one or more embodiments described herein can be facilitated. FIG. 8 and the following discussion are intended to provide a general description of a suitable operating environment 800 in which one or more embodiments described herein at FIGS. 1-7 can be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 800 contains an example of an environment for the execution of at least some of the computer code involved in performing the inventive methods, such as model training with active digital delegate code 845. In addition to block 845, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 845, as identified above), peripheral device set 814 (including user interface (UI), device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 1001 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 845 in persistent storage 813.

COMMUNICATION FABRIC 811 is the signal conduction paths that allow the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, the volatile memory is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface type operating systems that employ a kernel. The code included in block 845 typically includes at least some of the computer code involved in performing the inventive methods.

PERIPHERAL DEVICE SET 814 includes the set of peripheral devices of computer 1001. Data communication connections between the peripheral devices and the other components of computer 801 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed:

1. A system, comprising:

a memory that stores computer-executable components; and a processor that executes the computer-executable components stored in the memory, wherein the computer-executable components comprise:

a digital delegate component that accesses a teleconference via a computer application as a teleconference participant in place of the meeting invitee, the digital delegate being configured to represent the invitee's interests rather than provide meeting content of its own; and an analysis component that analyzes teleconference monitoring information of the teleconference in real time against a stored, invitee-specified set of defined points of interest to determine responses to one or more defined points of interest, wherein the defined points of interest are received from the invitee prior to the teleconference and are persistently associated with the invitee's profile, wherein the digital delegate utilizes the analyses of the analysis component to represent the invitee's interests during the meeting.

2. The system of claim 1, wherein the analysis component further determines whether the teleconference monitoring information fails to support a response to at least one of the one or more defined points of interest.

3. The system of claim 2, wherein the computer executable components further comprise:

a question component that, in response to a determination that the teleconference monitoring information fails to support a response to at least one of the one or more defined points of interest, generates and communicates to participants of the teleconference one or more questions to elicit information related to the at least one of the one or more defined points of interest.

4. The system of claim 1, wherein the computer executable components further comprise:

a prediction component that, prior to the teleconference, generates one or more predicted points of interest that will arise in the teleconference based on context of the teleconference.

5. The system of claim 4, wherein the prediction component further prompts the meeting invitee to input additional information relating to the one or more predicted points of interest.

6. The system of claim 1, wherein the computer executable components further comprise:

a summary component that generates a summary of the teleconference based on at least one of teleconference audio, teleconference video, or teleconference chat.

7. The system of claim 6, wherein the summary component further generates key points of the teleconference based on at least one of teleconference audio, teleconference video, or teleconference chat.

8. The system of claim 1, wherein the computer executable components further comprise:

an issue component that determines whether an issue that arises during the teleconference can be addressed with information present in a knowledge repository.

9. The system of claim 8, wherein in response to a determination that the issue can be addressed with the information present in the knowledge repository, the issue component generates a response to the issue that comprises the information present in the knowledge repository.

10. The system of claim 1, wherein the computer executable components further comprise:

a notification component that, in response to a determination that the issue can not be addressed with information present in the knowledge repository, communicates a message to the meeting invitee prompting the meeting invitee to join the teleconference.

11. A computer-implemented method, comprising:

accessing, by a system operably coupled to a processor, a teleconference via a computer application that is a digital delegate as a teleconference participant on behalf of an absent meeting invitee; and analyzing, by the system, teleconference monitoring information of the teleconference to determine responses to one or more defined points of interest previously designated by the invitee prior to the teleconference, wherein the analysis includes automatically correlating the monitoring information to the designated points of interest and generating proposed responses without requiring input from the invitee during the teleconference, wherein the digital delegate utilizes the analyses to represent the invitee's interests during the meeting.

12. The computer-implemented method of claim 11, further comprising:

determining, by the system, whether the teleconference monitoring information fails to support a response to at least one of the one or more defined points of interest.

13. The computer-implemented method of claim 12, further comprising:

in response to a determination that the teleconference monitoring information fails to support a response to at least one of the one or more defined points of interest, generating, by the system, one or more questions to elicit information related to the at least one of the one or more defined points of interest.

14. The computer-implemented method of claim 11, further comprising:

generating, by the system, one or more predicted points of interest that will arise in the teleconference based on context of the teleconference.

15. The computer-implemented method of claim 14, further comprising:

prompting, by the system, the meeting invitee to input additional information relating to the one or more predicted points of interest.

16. A computer program product facilitating attendance at a teleconference meeting by a digital delegate, the computer program product comprising a non-transitory computer readable storage medium having program instructions embodied therewith, the program instructions executable by a processor to cause the processor to:

access, by the processor, a teleconference via a computer application as a teleconference participant standing in for a meeting invitee; and analyze, by the processor, teleconference monitoring information of the teleconference to determine responses to one or more defined points of interest determined by a meeting invitee, the program instructions further causing storage of the invitee's defined points of interest in association with the invitee's profile and application of those points during the teleconference without further invitee intervention, wherein the digital delegate utilizes the analyses to represent the invitee's interests during the meeting.

17. The computer program product of claim 16, wherein the program instructions are further executable by the processor to cause the processor to:

determine, by the processor, whether the teleconference monitoring information fails to support a response to at least one of the one or more defined points of interest.

18. The computer program product of claim 17, wherein the program instructions are further executable by the processor to cause the processor to:

in response to a determination that the teleconference monitoring information fails to support a response to at least one of the one or more defined points of interest, generate, by the processor, one or more questions to elicit information related to the at least one of the one or more defined points of interest.

19. The computer program product of claim 16, wherein the program instructions are further executable by the processor to cause the processor to:

generate, by the processor, one or more predicted points of interest that will arise in the teleconference based on context of the teleconference.

20. The computer program product of claim 19, wherein the program instructions are further executable by the processor to cause the processor to:

prompt, by the processor, the meeting invitee to input additional information relating to the one or more predicted points of interest.

* * * * *